Figure 1:
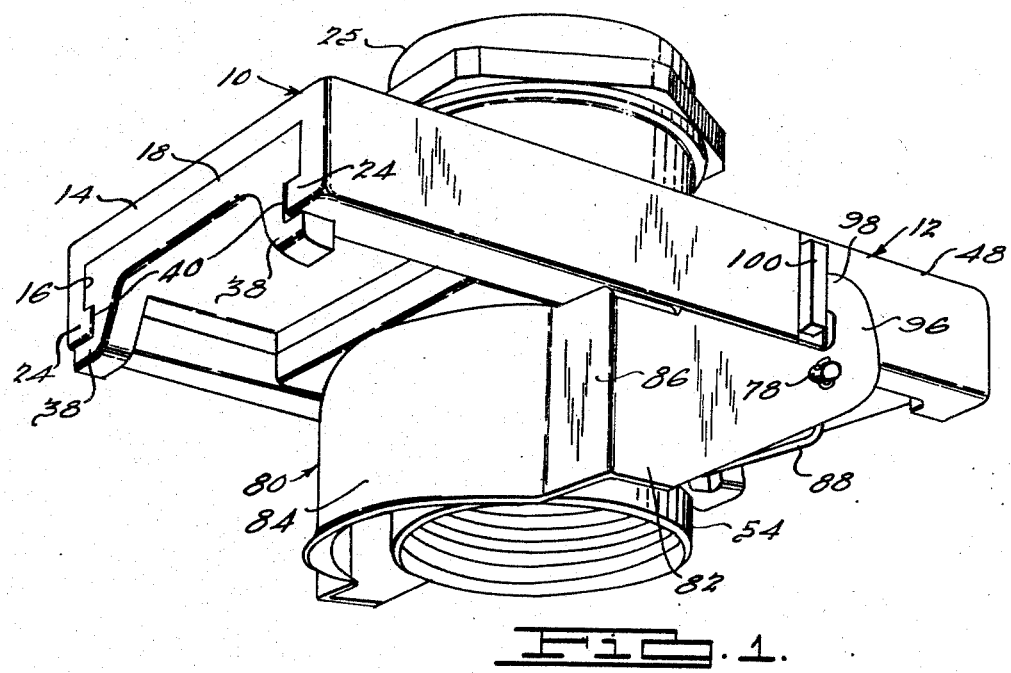

May 24, 1955

S. H. ZEEB 2,709,090

SLIDING PLATE TYPE COUPLING WITH
SLIDE PLATE LOCKING PINS

Filed June 25, 1952

2 Sheets-Sheet 1

INVENTOR.
Stanley H. Zeeb
BY
ATTORNEY.

May 24, 1955
S. H. ZEEB
2,709,090
SLIDING PLATE TYPE COUPLING WITH
SLIDE PLATE LOCKING PINS
Filed June 25, 1952
2 Sheets-Sheet 2
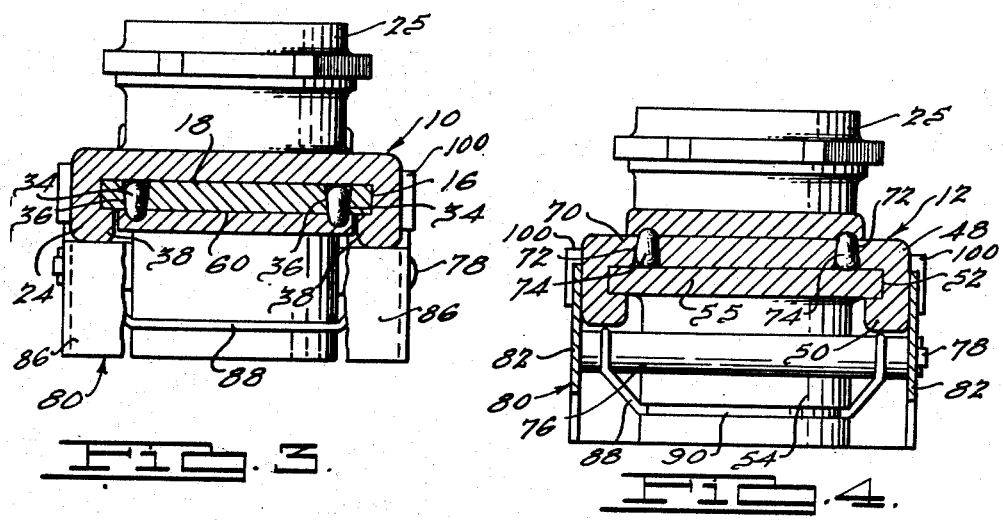
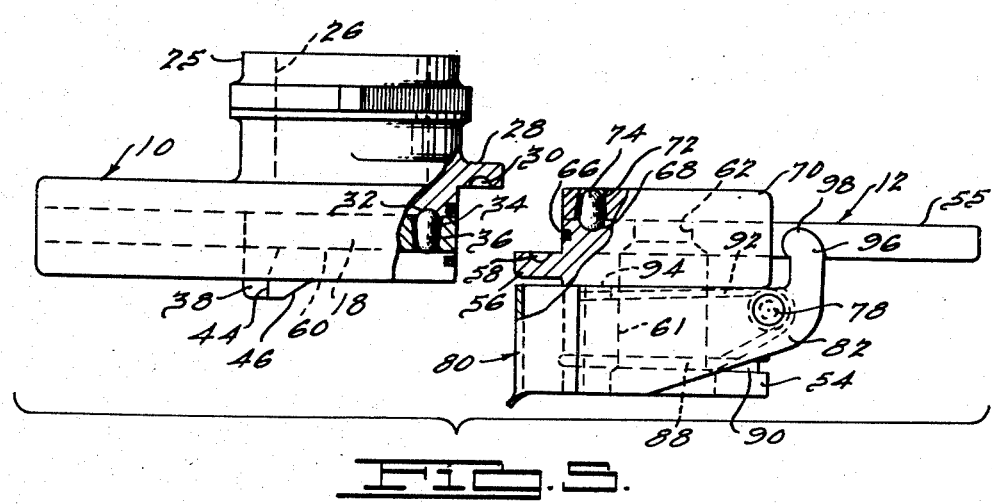
INVENTOR.
Stanley H. Zeeb.
BY
ATTORNEY.

United States Patent Office 2,709,090
Patented May 24, 1955

2,709,090

SLIDING PLATE TYPE COUPLING WITH SLIDE PLATE LOCKING PINS

Stanley H. Zeeb, Jackson, Mich., assignor to Aeroquip Corporation, Jackson, Mich., a corporation of Michigan Application June 25, 1952, Serial No. 295,533

4 Claims. (Cl. 284—4)

This invention relates to couplings for connecting fluid conductor pipes or the like and more particularly to couplings of the sliding plate type in which the connection and disconnection of a pair of companion coupling body parts is effected by a rectilinear pushing together and pulling apart of the body parts, respectively, and involves a relative sliding of flat plate surfaces on the body parts to control the opening and closing of fluid transfer ports.

In connection with these sliding plate type couplings it is necessary to provide that the slidable valve plates should be positively moved in opposite directions when pushing and pulling upon the coupling body parts to couple and uncouple the body parts, respectively, whereby the fluid flow ports controlled by these slidable valve plates are automatically opened as the body parts are pushed together to couple them, and are automatically closed when the body parts are pulled apart to uncouple them.

According to a prior coupling construction of this kind, as disclosed in U. S. Patent No. 2,500,847 dated March 14, 1950, the aforesaid positive movement of the slidable valve plates is effected by the inter-engagement of hook and ridge portions on the separable coupling parts, which inter-engagement necessitates movement of the coupling body parts in two directions substantially perpendicular to one another, since the hook portions extend perpendicularly to the direction of travel of the coupling body parts to couple and uncouple them and it is necessary to engage the hook portions in their ridge portions before the body parts can be made to so travel. To uncouple the body parts, they are pulled rectilinearly in opposite directions until the hook portions are positioned to disengage their ridge portions. Then the one body part has to be moved laterally with respect to the direction of such rectilinear movement in order to remove the hook portions from their ridge portions and permit the parts to be separated. It will be appreciated, therefore, with respect to these prior coupling constructions that a lateral relative displacement of the coupling body parts is necessary at the commencement and the termination of the coupling and uncoupling operations, respectively, and that space must be left in which to effect such lateral displacement. On the other hand, it frequently happens that these couplings as employed, for example, upon fuel lines on aircraft should be confined in the smallest possible space, or that a series of the couplings should be ganged so closely together, that this need for lateral displacement of the coupling body parts imposes undesirable limitations, which it is an important object of the invention to eliminate.

It is thus an object of the present invention to provide a sliding valve type coupling with which the inter-connection and the disconnection of the sliding valve plates on the two coupling body parts is capable of being effected with a straight push and pull action, to the exclusion of any necessity for displacing the body parts laterally, as with the prior coupling constructions.

This, and other objects and advantages of the invention, residing in the construction, arrangement and combination of parts, will become apparent from a consideration of the following detail description of one practical form of the invention, by way of example, with reference to the accompanying drawings, and from the appended claims.

Figure 2:
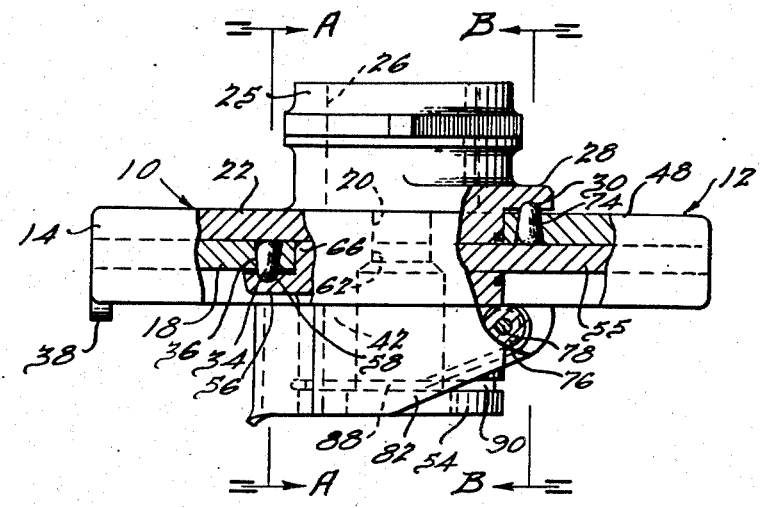

In the drawings:

Fig. 1 is a perspective view of a coupling assembly in accordance with the invention, with the coupling parts shown connected together, Fig. 2 is a side elevational view of the coupling assembly as seen in Fig. 1, with portions broken away and sectioned to show the connector pins, Fig. 3 is a cross section of Fig. 2 on the line A—A, Fig. 4 is a cross section of Fig. 2 on the line B—B, and Fig. 5 is a similar view to Fig. 2 but showing the coupling at the instant of disconnection.

Referring to the drawings, 10 and 12 indicate, generally, the two coupling body parts.

The body part 10 comprises an outer rectangular part 14 formed with a female guideway 16 in which a valve slide plate 18 is slidably mounted with respect to a port 20 in the otherwise closed top wall 22 of the body part 10, which body part is of channel section and presents inturned side flanges 24 at the bottom defining the guideway 16. Rigid with the top wall 22 is a tubular boss 25, the enlarged bore 26 of which is in communication with the port 20 and may be screw-threaded for the connection of this body part to a fluid conductor, such as a tube section (not shown). Also rigid with the top wall 22, and extending from one end thereof, there is a tongue portion 28 (Figs. 2 and 5) formed in its underneath surface with a pair of laterally spaced circular depressions 30, the purpose of which will be described later. Similar depressions 32 (Fig. 5) are provided in the underneath surface of the wall 22 at the end thereof (referred to hereafter as the "inner end") adjacent the tongue 28. A pair of spherical ended pin elements 34 are mounted in laterally spaced holes 36 extending through the valve slide plate 18, which plate, at the end thereof (referred to hereafter as the "outer end") remote from the tongue 28 is formed, on its opposite sides, with outwardly projecting flange portions 38 which slidably engage beneath the guideway flanges 24 and define, with the plate 18, guide slots 40 in which the guideway flanges engage. These flanges 24, on their underneath surface are formed with downwardly projecting lugs 42, presenting on their outer ends, vertical walls 44 (Fig. 5) and, on their inner ends, inclined ramp surfaces 46 of about 30° inclination.

Turning now to the body part 12, this comprises an outer rectangular body part 48, also of channel section, and having bottom inturned flanges 50 (Fig. 4) defining a guideway 52 for the sliding engagement of this body part with respect to an elongated rectangular plate 55 providing, in an integral structure, a hollow boss 54 and a tongue portion 56 having a pair of laterally spaced circular depressions 58 in its upper surface, as presented to the bottom surface 60 of the slide valve plate 18, it being appreciated that this reference to "top" and "bottom" and "underneath" has reference to the position of the parts as seen in the drawings.

The boss 54 has an enlarged internally screw-threaded bore 61, for the connection of this coupling body part 12 to another fluid conductor, such as a tube section (not shown), which bore 61 is in communication with a reduced port 62 in the plate 55 capable of being brought into register with the port 20, as seen in Fig. 2. At its inner end, as presented to the slide valve plate 18 on the opposed coupling body part 10, the plate 55 is formed with a laterally extending channel, in which a sealing strip 66 is mounted. Also provided in the upper surface of the plate 55, at the end thereof adjacent the tongue 56, are a pair of laterally spaced circular depressions 68 (Fig. 5), similar to the depressions 58 and to the aforesaid depressions 30 and 32 on the other coupling body part. The top closed wall 70 of the body part 48 has a pair of laterally spaced holes 72 therethrough, corresponding with said depressions 68, in which holes a pair of spherical ended pins 74 are mounted. The body part 48 is slidable with respect to the plate 55 and forms the closure member of the coupling part 12.

The boss 54, on the side thereof remote from the tongue 56 and immediately beneath the sliding body part 48, is formed with a laterally extending elongated boss 76, in which boss a hinge pin 78 is mounted, said hinge pin serving for the hinged mounting of a lever device, indicated generally at 80. This lever device is adapted to be hand actuated to free the coupling body parts 10 and 12 for disconnection from their coupled condition, as seen in Fig. 1, and to be automatically tripped upon coupling the body parts together, as will be clear from the following description.

The lever device 80 is of fork-like construction and comprises a pair of similar side limbs 82, which extend upon opposite sides of the boss 54, and a closed end 84 of substantially semi-cylindrical formation concentrically disposed with respect to the boss 54 and presenting angular portions 86 (Figs. 1 and 2) for location against the vertical sides 44 of the lugs 42 in the fully coupled condition of the coupling body parts. The lower edge portion 81 of the closed lever end 84 is bent outwards to form a finger grip to facilitate actuation of the lever to swing its closed end downwardly to free the angular portions from the lugs 42 when it is desired to uncouple the body parts. The lever device 80 is urged into the closed position as seen in Fig. 1, by a bent spring strip 88 looped about an annular groove 90 in the boss 54 and about the hinge pin boss 76 (as seen clearly in Fig. 2) and having bent back ends 92 retained against inturned flange portions 94 on the side limbs 82. At their outer free ends, remote from the closed end 84, the limbs 82 are formed with vertical extensions 96 each formed with a nose 98 (Figs. 1 and 5), which noses, in the coupled condition, engage against side lugs 100 on the body part 48 and are urged into engagement with the lugs 100 by the action of the spring 88. This lever device forms no part of the present invention but forms the subject matter of my co-pending application Serial No. 292,054, filed June 6, 1952.

In operation, and referring first to the uncoupled body parts 10 and 12, as seen in Fig. 5, in this condition of the parts the sliding body part 48 of the coupling part 12 is in position on the plate part 55 where it closes the port 62 in this plate part, whereas the slide plate 18 of the other coupling part 10 is in position on its body part 14 where it closes the port 20. Also in this condition of the parts the pins 74 on the sliding part 48 are engaged at their lower spherical ends in the depressions 68 in the plate 55, whereas the pins 34 on the sliding plate 18 are engaged at their upper spherical ends in the depressions 32 in the body part 14, it being appreciated that these pins, after disconnection of the coupling parts will normally fall by gravity to a lowered position compared with their raised position, as seen in Figure 5, although it may sometimes happen in practice that the pins may remain in the raised position due to the presence of lubricant stickiness. It is convenient to point out here that the pins 34 and 74 are in the form of taper pins, with the holes 36 and 72 being correspondingly tapered to permit the pins to be inserted into their respective holes from one end thereof and be retained against falling out of their holes once the parts 14 and 18 and 48 and 55 have been assembled. At the same time the pins (which are slightly longer than their holes) are free to move upwards and downwards in their holes to project one or the other of their opposite spherical ends beyond the holes for engagement in the depressions 30, 32, 58, 68, as will now be described.

To couple the parts 10 and 12, positioned as seen in Fig. 5, it is merely necessary to engage the tongue 56 against the underneath surface 60 of the slide plate 18 while at the same time the tongue 28 is fitted over the top surface of the part 48. This positions the depressions 58 over the lower ends of the pins 34 and the depressions 30 over the upper ends of the pins 74 and at the same time brings the opposed ends of the body parts 14 and 48 into abutment against one another, with the lugs 100 on the body part 48 abutting the adjacent end of the body part 14. With the parts thus engaged, pushing the coupling parts 10 and 12 in opposite directions will be accompanied by vertical movement of the pins 34 and 74, with the lower ends of the pins 34 being cammed downwardly into the depressions 58 and the upper ends of the pins 74 being cammed upwardly into the depressions 30. Accordingly, the slide part 48 of the coupling part 12 is keyed by the pins 74 to the body part 14 of the other coupling part 10, whereas the slide part 18 of the coupling part 10 is keyed by the pins 34 to the plate 55 of the coupling part 12.

This, therefore, results in the parts 14 and 48 being united by the pins 74 for movement as a unit relatively to the parts 55 and 18, said parts 55 and 18 being united by the pins 34. Continued pushing upon the coupling parts 10 and 12 in opposite directions will result in the slide part 18 being pushed to the left in the guideway 16 (to the position as seen in Fig. 2, in which the port 20 is open) at the same time as the body part 48 is pushed to the right on its guide plate 55 to open the port 62. Simultaneously with such movement, the closed end 84 of the lever 82 will snap over the lugs 42 and position the lugs 100 against the end of the body part 14 with the noses 98 on the lever extensions 96 urged into engagement with the lugs 100 by the action of the spring 88. When the lever snaps over the lugs 42 the engagement of the lever angle parts 86 behind the vertical lug walls 44 locks the coupling parts 10 and 12 against separation, with the coupling operation completed and the ports 20 and 62 in fluid flow register with respect to the bores 26 and 61 in their respective bosses 24 and 54.

To uncouple the parts 10 and 12, the lever 80 is grasped at the finger grip portion 81 and is swung downwardly, from its closed end, about the pivot pin 78 to remove the upper end portion of the closed end of the lever from the path of the lugs 42. At the commencement of this swinging movement the noses 98 push (to the left as seen in Fig. 1) against the lugs 100 and apply a force to these lugs which has the effect of applying a force to the parts 18 and 55, keyed together by the pins 34, and this relatively to the parts 14 and 48, keyed together by the pins 74. This relative movement is relied upon to break any adherence which may exist between the pin united slide plates and sealing means on their respective body parts. With the lever 80 disengaged from the lugs 42 the coupling parts 10 and 12 are free to be pulled apart. In so doing the slide part 18 is constrained, by the pins 34 (still engaged in the depressions 58) to move with the plate part 55 at the same time as the part 48 is constrained by the pins 74 (still engaged in the depressions 30) to move with the body part 14. Accordingly, as the coupling parts 10 and 12 are pulled apart the parts 18 and 48 are constrained to slide back into their positions as seen in Figs. 4 and 6, where they close their respective ports 20 and 62. When this position is reached, the lower ends of the pins 34 are pushed out of the depressions 58 and engaged at their upper ends in the depressions 32, while at the same time the upper ends of the pins 74 are disengaged from the depressions 30 and engaged at their lower ends in the depressions 68. At the same time the flanges 38 on the slide 18 are brought to rest against the lugs 42 (as seen in Figs. 4, 5 and 6), and curved ends on the guide flanges 48 are brought to rest against the boss 54. This prevents the slide parts from over-travelling, which if allowed to occur would permit the aforesaid pins to fall out.

It is to be noted that the construction and arrangement of the pins 34 and 74, and their associated holes and depressions, enables the desired coupling and uncoupling operations to be effected simply by rectilinear movement of the parts 10 and 12 in one direction, since movement of the pins in the direction perpendicular thereto is effected automatically by the camming of the pins with respect to opposite ends of their retaining holes 36 and 72 at the termination of the pushing and pulling operations employed to connect and disconnect the two coupling parts.

Having thus described my invention, what I claim as novel and wish to secure by Letters Patent is as follows:

1. In a coupling, a pair of coupling parts each comprising two parts, one said part haivng a port and the other part being in the form of a slidable valve member for opening and closing said port, each said part having a flat surface, means mounting each said valve member for rectilinear sliding movement upon its ported part with said flat surfaces in mutual sliding engagement, said means including guides on each said coupling part, said ports being open to the flat surfaces of their parts, each said coupling part having an extended portion at one end, the extended portion on one coupling part being engageable upon one side of the other coupling part to position the coupling parts in end to end opposed abutting relation with the extended portion on said other coupling part being simultaneously engaged upon the side of the opposed coupling part opposite said side of the other coupling part and the said guide in register, said end to end opposed relation being possible by movement of said coupling parts in a single rectilinear plane, one part of each coupling part being engageable in the guide means in the opposite coupling part upon relative rectilinear displacement of the abutted coupling parts, displaceable connector means on said coupling parts and carried by said slidable valve members, and means on said ported parts cooperable with said connector means for displacing the connector means incident to said relative rectilinear displacement for connecting one part of each coupling part for united movement with one part of the opposite coupling part, and means on said extended portions for receiving said displaced connector means.

2. A coupling as claimed in claim 1, said connector means comprising a pin element slidably mounted in an opening in one part of each said coupling parts, said pin elements being slidable in a plane perpendicular to the direction of said rectilinear movement, the other part of each coupling part having a recess, one end of each said pin element being substantially in alignment with the recess of its said other part when the valve members are in closed position, and said extended portions of the coupling parts having recesses, said pin element on each coupling part engaging in the recess in the extended portion of the other coupling part when the movable valve members are moved to open position.

3. In a coupling, a pair of coupling parts each comprising two parts, one said part having a port and the other part being in the form of a slidable valve member for opening and closing said port, each said part having a flat surface, means mounting each said valve member for rectilinear sliding movement upon its ported part with said flat surfaces in mutual sliding engagement, said means including guide channels on each said coupling part, said ports being open to the flat surfaces of their parts, each said coupling part having an extended portion at one end, the extended portion on one coupling part being engageable upon one side of the other coupling part to position the coupling parts in end to end opposed abutting relation with the extended portion on said other coupling part engaged upon the side of the opposed coupling part opposite said side of the other coupling part and the said guide channels in register, said end to end opposed relation being possible by movement of said coupling parts in a single rectilinear plane, each said extended portion having a recess, one part of each coupling part being engageable in the guide channels in the opposite coupling part upon relative rectilinear displacement of the abutted coupling parts, displaceable connector pins on said coupling parts in position to engage said recesses when said coupling parts are positioned in said end to end abutting relation, and means mounting said connector pins for displacement incident to said relative rectilinear displacement to engage said pins in said recesses and connect one part of each coupling part for united movement with one part of the opposite coupling part.

4. In a coupling, a pair of coupling parts each comprising two parts, one said part having a port and the other part being in the form of a slidable valve member for opening and closing said port, each said part having a flat surface, means mounting each said valve member for rectilinear sliding movement upon its ported part with said flat surfaces in mutual sliding engagement, said means including guide channels on each said coupling part, said ports being open to the flat surfaces of their parts, each said ported coupling part having an extended portion at one end, the extended portion on one coupling part being engageable upon one side of the other coupling part to position the coupling parts in end to end opposed abutting relation with the extended portion on said other coupling part engaged upon the side of the opposed coupling part opposite said side of the other coupling part and the said guide channels in register, said end to end opposed relation being possible by movement of said coupling parts in a single rectilinear plane, one part of each coupling part being engageable in the guide channels in the opposite coupling part upon relative rectilinear displacement of the abutted coupling parts, each said extended portion having a recess and each said slidable valve member having holes therein, pin means slidably mounted in said holes for movement in a direction perpendicular to the direction of said rectilinear movement, each said ported coupling part having a recess, said pins being substantially in alignment with the recesses in said ported parts when the valve members are in closed position and each said extended portion having a recess in position for engagement by said pins when said coupling parts are in said abutted relation.

References Cited in the file of this patent

UNITED STATES PATENTS

| | | |
|---|---|---|
| 1,215,481 | Cantin | Feb. 13, 1917 |
| 2,399,516 | Snyder | Apr. 30, 1946 |
| 2,399,525 | Waag | Apr. 30, 1946 |
| 2,403,620 | Snyder et al. | July 9, 1946 |
| 2,500,847 | McKay | Mar. 14, 1950 |

FOREIGN PATENTS

| | | |
|---|---|---|
| 232,056 | Great Britain | Apr. 16, 1925 |